(12) United States Patent
Penn

(10) Patent No.: US 6,685,141 B2
(45) Date of Patent: Feb. 3, 2004

(54) X33 AEROSHELL AND BELL NOZZLE ROCKET ENGINE LAUNCH VEHICLE

(75) Inventor: Jay P. Penn, Redondo Beach, CA (US)

(73) Assignee: The Aerospace Corporation, El Segundo, CA (US)

(*) Notice: Subject to any disclaimer, the term of this patent is extended or adjusted under 35 U.S.C. 154(b) by 105 days.

(21) Appl. No.: 09/819,913

(22) Filed: Mar. 28, 2001

(65) Prior Publication Data

US 2002/0139901 A1 Oct. 3, 2002

(51) Int. Cl.[7] ............................................. B64G 1/40
(52) U.S. Cl. ..................... 244/162; 244/158 R; 244/160
(58) Field of Search .............................. 244/162, 160, 244/158 R, 172, 169

(56) References Cited

U.S. PATENT DOCUMENTS

| | | | | |
|---|---|---|---|---|
| 3,369,771 A | * | 2/1968 | Walley et al. | 244/158 R |
| 3,702,688 A | * | 11/1972 | Faget | 102/158 R |
| 3,866,863 A | * | 2/1975 | Von Pragenau | 244/162 |
| 3,955,784 A | * | 5/1976 | Salkeld | 244/172 |
| 4,452,412 A | * | 6/1984 | Von Pragenau | 244/172 |
| 4,557,444 A | * | 12/1985 | Jackson et al. | 244/172 |
| 4,834,324 A | * | 5/1989 | Criswell | 244/172 |
| 4,884,770 A | * | 12/1989 | Martin | 244/158 R |
| 5,129,602 A | * | 7/1992 | Leonard | 244/172 |
| 5,141,181 A | * | 8/1992 | Leonard | 244/172 |
| 5,143,328 A | * | 9/1992 | Leonard | 244/158 R |
| 5,217,187 A | * | 6/1993 | Criswell | 244/158 R |
| 5,568,901 A | * | 10/1996 | Stiennon | 244/158 R |
| 6,360,994 B2 | * | 3/2002 | Hart et al. | 244/158 R |

FOREIGN PATENT DOCUMENTS

| | | | | |
|---|---|---|---|---|
| JP | | 4358999 | * 12/1992 | 102/172 |

OTHER PUBLICATIONS

Krishnan, S. Reusable Launch Vehicle (RLV) Technology, No date [online]. Chennnai, India. [retrieved May 01, 2002]. Document retrieved from the Internet <http://www.aero.iitm. ernet.in/~skrish/rlv.htm>.*

Support to the Warfighter. The AFRL Monthly Accomplishment Report Executive Summary [online]. Feb., 2001. [retrieved on May 01, 2002]. Retrieved from the Internet: <http://www.afrl.af.mil/accompropt/feb01/accomp-feb01.htm>.*

Rocketdyne RS-68 engine certified for Boeing Delta 4. Spaceflight Now. Jan. 2002 [online]. Boeing news release. [retrieved May 01, 2002] retrieved from the Internet <http://spaceflightnow.com/news/n0201/28rs68/.*

Cut-Price shuttle to take commerce to the edge of space The x33. The Guardian. Mar. 1999. [Online]. retrieved from the Internet <http://proquest.umi.com/pqdweb?TS=102026 . . . = 1&Dtp=1&Did=000000039373634&Mtd=1&Fmt=3>.*

* cited by examiner

Primary Examiner—Charles T. Jordan
Assistant Examiner—Lulit Semunegus
(74) Attorney, Agent, or Firm—Derrick Michael Reid

(57) ABSTRACT

Various launch vehicles configurations each include an X33 aeroshell of a booster or orbiter both of which use bell nozzle engines, and a feeding stage for supplying liquid propellant to the engines for providing primary lifting thrust for lifting a payload into orbit. The feeding stage can be an external tank without engines or a core vehicle also with bell nozzle engines. The orbiter or booster use three, two-two or five bell nozzle engines configurations and the feeding stage uses a zero or two bell nozzle engines. The combination of orbiters, boosters, external tanks and core vehicles offer a variety of configuration to meet particular mission requirements.

17 Claims, 5 Drawing Sheets

SINGLE ORBITER FIVE ROCKET ENGINE LAUNCH VEHICLE

FIVE ROCKET ENGINE ORBITER

SINGLE ORBITER FIVE ROCKET
ENGINE LAUNCH VEHICLE

FIVE ROCKET ENGINE
ORBITER

FOUR ROCKET ENGINE BOOSTER AND
THREE ROCKET ENGINE ORBITER LAUNCH VEHICLE

THREE ROCKET
ENGINE ORBITER

FOUR ROCKET
ENGINE BOOSTER

TWO-TWO ROCKET ENGINE ORBITER

DUAL BOOSTER AND CORE
STAGE LAUNCH VEHICLE

X33 AEROSHELL AND BELL NOZZLE ROCKET ENGINE LAUNCH VEHICLE

FIELD OF THE INVENTION

The invention relates to the field of launch vehicles. More particularly the invention relates to launch vehicular configurations including X33 aeroshell, external tank, and bell nozzle rocket engines.

BACKGROUND OF THE INVENTION

The recently conducted, space transportation architecture study reviewed a wide range of launch concepts all proposed as options to replace the space shuttle. An independent assessment of these concepts determined that none were able to satisfy the wide range of design requirements that are demanded of a system to replace the space shuttle. The majority of the proposed launch systems are also being designed to meet commercial space lift needs. This commercial market demands that an additional set of challenging requirements be met.

One of the most demanding of the system design requirements for a launch system that is capable of performing both Civil (NASA) and commercial missions is to limit the development cost for the complete system to, on the order of, $2 Billion dollars. Using present year dollars, this figure is less than 10% of the original development cost of the space shuttle system. A number of contributing factors limit the development cost that is allowable. There is a the high cost on return on investment to obtain development funds for high risk development. There is a long duration between initial investment and an operational system with associated revenues. There is a the relatively small addressable launch market once operations begin. And, there is the relatively unknown demand elasticity environment in the launch market.

In addition to requiring low development costs, any system that is to replace the space shuttle must also be extremely reliable. This reliability is required not only over the long haul but also from the onset of initial operations. In addition, the new system must meet new manned flight human rating safety standards established by NASA. One of these safety standards demands that the system provide the ability for safe crew escape capability throughout the entire flight trajectory. The new set of safety standards is considerably more stressing than those required of the current space shuttle system. In fact, no other transportation system requires full crew escape throughout the entire journey. Rather, current transportation systems, such as commercial aircraft, are designed to be inherently safe and reliable and also provide for graceful degradation rather than accept catastrophic failure modes in the design.

Independent of NASA safety needs, the numerous direct and indirect costs associated with a catastrophic failure event implies the need for an extremely reliable design that precludes, within practicality, catastrophic system failures. Examples of design features that help to prevent such catastrophic failures include: full engine out from liftoff, full vehicle abort capability throughout the entire mission, robust design and operating margins, and integrated vehicle health management. The integrated vehicle health management working in conjunction with the vehicle management system provides the capability to anticipate impending system failures and or react promptly to unanticipated failures and take appropriate action to mitigate the risk associated with such failure. Such a capability implies heritage of the major system components and subsystems so that nominal and off nominal operating conditions can be recognized and dealt with accordingly. The alternative to a large degree of design heritage is to conduct an extremely expensive flight test program in which the system is fully characterized before revenue generating flight begins. This later option is most likely prohibitive in the space launch industry due to the small launch market in which to amortize these costs. The integrated vehicle health management system also provides vehicle health information in order to enable rapid and low maintenance cost turnaround of the launch system in preparation for the next mission. This capability is needed to meet cost goals. A requirement to allow incremental flight test is also important and allows the launch system to be characterized prior to subjecting it to overly stressing conditions. This incremental approach allows operating changes or design fixes to be incorporated before design or fabrication problems are allowed to cause a serious failure.

Other performance related requirements relating to space lift capability and recurring cost must also be met. The space shuttle orbiter has an injected weight of approximately 170K pounds with the exact weight being orbiter specific, for an enclosed usable volume for propellants and payload of 11K cubic feet. Using a metric of the ratio of injected mass to enclosed volume, the shuttles orbiter metric is 15.5, and is unsuitable for housing both propellant and a sizable payload. The system must lift approximately 25K pounds of cargo and crew to the international space station orbit and also be able to return crew and cargo from the international space station safely to Earth. It is also highly desirable that the launch system be able to evolve to support future Mars exploration missions. This demands a much heavier lift capability to low earth orbit than required for the international space station alone. Furthermore, to justify even a modest investment in a new launch system, the recurring cost must be low on the order of providing commercial space lift prices of less than $2,500 per pound including fully amortized development and production costs as well as cost of financing and allowance for profit.

The ideal concept should also be capable of evolving into a third generation launch system. Such a system would be capable of providing extremely low launch costs, in the range of $100 to $500 per pound, with levels of operability and reliability comparable to those of aircraft. This set of almost mutually exclusive design requirements for low development and operation costs, extreme reliability and safety, heavy lift, evolutionary capability, and heritage with flight proven hardware could not be met by any of the launch systems recently proposed to replace the Shuttle. Consequently, the transportation architecture study concluded that because no near term launch system could satisfy all of these requirements, the U.S. should continue operation of the space shuttle well into the future.

The space shuttle orbiter employs a wing body configuration and was designed with structural and thermal protection materials available since the late 1970s. The consequence of orbiter design approach and then available technologies yielded a vehicle design with a poor figure of performance in terms of the ratio of internal volume compared to the overall dry mass of the vehicle. The internal volume is used principally to house either propellants or payload. The poor internal volume to mass ratio of the space shuttle orbiter dictated the need for a large quantity of propellant and thus liftoff mass to accelerate the space shuttle orbiter and the payload to orbital velocity. Ultimately, the poor liftoff performance led to a decision that a rocket booster stage would be required to provide both the majority of liftoff thrust and initial acceleration, or impulse, of the space shuttle system. Segmented solid rocket motor powered boosters were selected for this purpose. The solid rocket boosters were intended to provide lower development costs than would reusable liquid boosters. However, the solid rocket booster operations significantly increased both operating costs and catastrophic failure modes of the space shuttle system. The extensive solid rocket booster recovery and refurbishment activities required after each flight also contributed to the large operations cost increase associated with the solid rocket boosters.

The solid rocket booster also had other liabilities. Once lit, the solid rocket boosters could not be turned off until their solid propellants were fully consumed. This is a major contributor to the inability of the space shuttle orbiter and the crew to abort during the first several minutes of each flight when the solid rocket boosters are providing the majority of the thrust from the space shuttle system. Another key contributor to the inability of the space shuttle orbiter to escape either a failed solid rocket booster or external tank (ET) and safely return to the launch site is a consequence of the design of the space shuttle orbiter that was designed to not house any propellants to operate the primary rocket engines or the space shuttle main engines (SSMEs). As a consequence of this lack of available propellants in the space shuttle orbiter, the SSMEs could not provide thrust to separate and operate the orbiter once detached from the ET. Thus, no means was provided for the space shuttle orbiter and the crew to escape the remainder of the space shuttle system in an emergency.

During the design of the space shuttle much emphasis was placed on reducing the required surface area of the expensive and labor intensive to maintain thermal protection system. A decision to utilize an expendable ET to house the primary liquid oxygen (LOX) and liquid hydrogen (LH) propellants rather than house the primary propellants inside the space shuttle orbiter enabled a great reduction in the size of the thermal protection system that would otherwise be required. This design approach also contributed to reducing system mass. The lack of experience in reuse of the primary LOX and LH propellant tanks further dictated the need to house primary LOX and LH propellants in an ET. These design choices led to the development of a complex space shuttle system that is still very expensive to operate, can only sustain a flight rate of approximately two flights per year for each orbiter, and is relatively intolerant of many critical failures of key flight systems.

Several years ago, the venturestar vehicle was proposed as a replacement to the space shuttle. The venturestar was envisioned to be capable of achieving single stage to orbit in which the entire vehicle and its payload could be accelerated to orbit without discarding any stages along the way. It was envisioned that such a system could address many of the design challenges associated with the space shuttle. The venturestar design employed a volumetrically efficient shape that significantly increased the ratio of internal volume of the venturestar compared to the dry weight of the venturestar. As indicated above, this improved figure of performance over the space shuttle orbiter enabled a reduction in the propellant mass required for the venturestar and its payload of approximately 25K pounds to be delivered to international space station orbit. If successful, this reduction in propellant mass could be used to entirely eliminate any type of propulsion to augment the thrust or propellant mass of the venturestar.

The shape of the aeroshell selected for venturestar combined with reduced reentry crossrange requirements yielded a reduction in the heat load that the venturestar would experience during reentry into the atmosphere of earth. This reduction in heat load allowed a metallic based thermal protection system design to be used on the venturestar. The metallic based thermal protection system is envisioned to be more robust and less costly to maintain than the ceramic thermal protection system currently used on the space shuttle orbiter.

NASA recognized that even with the major design and technology advances incorporated into the venturestar, the technological risk of achieving single stage to orbit was still very high. As a consequence, NASA jointly funded with industry the development of a subscale prototype named X33. The X33, rather than being designed as a vehicle that is itself capable of carrying payload to orbit, is under development as a demonstrator of the technologies and performance levels that would be required to demonstrate that the larger venturestar vehicle would be capable of delivering significant payload to orbit.

The X33 was chosen to be photographically half scale compared to the venturestar. As a consequence of surface to volume ratio scaling, the smaller X33 yields a reduced ratio of interior volume to dry mass than does the larger venturestar. As a consequence, the X33 was anticipated to be capable of demonstrating acceleration to a velocity of approximately 15K feet per second but with little or no useful payload. Such a level of performance was considered adequate to demonstrate that the larger venturestar would be able to achieve orbital velocity of approximately 25K feet per second plus approximately 25K pounds of payload.

As the X33 underwent development some of the key design approaches and technologies employed did not live up to expectations and subsequently the dry mass of the X33 increased. Due to internal volume and liftoff thrust limitations, the increased dry mass of the X33 yielded a reduction of the ultimate velocity that could be achieved with the X33. This consequence lent further doubt as to whether or not the venturestar goal of single stage to orbit was achievable. As a consequence, excitement for the development of venturestar and the precursor X33 demonstrator has waned.

Aerospike engines were selected to power the X33 and also the larger venturestar. The unique external expansion aerospike nozzle was the key component of an aerospike engine system. The improved external expansion aerospike nozzle was envisioned to provide a small reduction in the amount of propellant that would be required to achieve orbital velocity compared to that using more traditional bell nozzles. However, the aerospike design introduced several key disadvantages into both the design of the X33 and of the venturestar. The aerospike nozzle design required that pressurized gases be provided to fill the base area of the X33 vehicle. This was necessary to reduce base area induced drag to an acceptable level. Unfortunately, this requirement eliminated use of higher performing engine cycles such as the staged combustion cycle that is currently employed in the SSME and full flow staged combustion cycle such as used in the integrated powerhead demonstration.

These high performance engine cycles do not produce a pressurized exhaust gas stream that would be required to fill the base area of the vehicles. Therefore, a lower performing gas generator combustion cycle was selected for use with the aerospike nozzle. The combined effect of the more efficient aerospike nozzle and the lower performing gas generator cycle does not seem to offer a clear performance advantage over a traditional bell nozzle engine employing a staged combustion cycle at the vehicle system level. Furthermore, studies suggested that if an improved nozzle that was specifically designed to work with a staged combustion cycle were employed, such as a dual bell nozzle, any modest advantage of the aerospike engine would be further mitigated. It is therefore not clear that the widely claimed performance advantage of the aerospike engine will be practically realized.

More importantly, the inventor determined that the aerospike engine design employed on the X33 had one very negative performance characteristic that was not obvious to those skilled in the art. For aerospike engines to operate efficiently they require a much larger expansion area than does an equivalent thrust staged combustion engine and nozzle combination. To provide adequate thrust to lift the X33 its aerospike engines require virtually the entire base area of the vehicle to be used as an expansion surface for the exhaust plume of the engines. Specifically, the ratio of thrust produced per unit area of vehicle base area is significantly less than that achieved with existing staged combustion engines such as the SSME. One consequence of this is that the thrust output of the X33 is much more limited that would be possible if staged combustion engines were employed. Specifically, the two X33 aerospike engines are limited to a combined thrust of approximately 400K pounds.

As a consequence of the limited thrust capability and limited internal volume capability, the X33 was not designed to, nor could achieve orbital capability. It was also not clear that the significantly larger and more expensive venturestar could achieve the goal of single stage to orbit and therefore the single stage to orbit venturestar may never be built. Finally, the space shuttle system of which the venturestar was to replace, continues to be costly to operate and also suffers many critical failure modes. These and other disadvantages are solved or reduced using the invention.

SUMMARY OF THE INVENTION

An object of the invention is to provide a launch vehicle having an efficient fuel usage for payload to orbit.

Another object of the invention is to provide a launch vehicle having a bell nozzle rocket engine coupled to existing X33 aeroshells for efficient delivery of a payload into orbit.

Yet another object of the invention is to provide a launch vehicle having an external tank coupled to existing X33 aeroshells for efficient delivery of a payload into orbit.

Still another object of the invention is to provide a launch vehicle having an external tank and bell nozzle rocket engines coupled to existing X33 aeroshells for efficient delivery of a payload into orbit and to provide flight reentry of an orbiter.

A further object of the invention is to provide a launch vehicle having an external tank and bell nozzle rocket engines coupled to existing X33 aeroshells for efficient delivery of a payload into orbit.

The present invention is directed to a class of launch vehicles characterized by one or more rocket stages having bell nozzle rocket engines for thrusting with the rocket stages using X33 aeroshell flight control surfaces, and characterized by an attached propellant feeding stage for the efficient delivery of a payload into space. The rocket stages can be in the preferred forms an orbiter, a booster, two boosters or a booster and an orbiter. The orbiter preferably includes a payload bay. The propellant feeding stage in the preferred forms can be an external tank (ET) or a core stage the later of which preferably includes two bell nozzle rocket engines and a payload bay. The bell nozzle engines are preferably space shuttle main engines (SSME), NK33 rocket engines or RS68 rocket engines. The use of these components provides a variety of launch systems having a wide variety of capabilities.

The first form of the invention is a single orbiter five rocket engine launch vehicle. The orbiter includes five SSMEs and is attached to an ET that is shorter in length and to accommodate modified load paths into the orbiter. The orbiter uses an X33 aeroshell to provide a large internal volume but having reduced dry weight. The launch vehicle mates an X33 aeroshell orbiter to a modified ET. The single orbiter five rocket engine launch vehicle and the ET house additional propellants that would be required to lift the X33 aeroshell orbiter as well as a useful payload to a desired orbital velocity. To provide adequate thrust to launch the launch vehicle, five SSMEs are used to offer higher performance measured in thrust per unit base area. The large space available on the base of the X33 aeroshell orbiter is sufficient to enable locating up to five SSME along the base of the X33. Thus, the thrust level of the X33 aeroshell orbiter is increased to over 2000K pounds. The liftoff mass is constrained so that with the loss of thrust of a single engine at liftoff adequate thrust would still be provided to adequately lift the launch vehicle from the launch pad and enable a safe return to launch site. A significant portion of the interior volume of the X33 aeroshell orbiter is reallocated to provide payload carrying volume rather than providing volume for propellants. As a consequence of the high performance of the X33 aeroshell orbiter when reoutfitted with SSME engines, the internal volume of the modified ET provides sufficient capacity to house the majority of the primary propellants to achieve orbital velocity.

In a second form, a three rocket engine orbiter with a four rocket engine booster are both attached to an external tank that communicates propellants to the rocket engines of the orbiter and booster. In this preferred form, the four rocket engine booster is used to augment both the thrust capability and the propellant load of the launch system thus significantly increasing the amount of payload that can be lifted. Virtually all of the available internal volume of the four rocket engine booster is used to house propellants that are used during the initial vehicle ascent. Once at a velocity of approximately mach three and exhausted of propellants, the four rocket engine booster glides back to the launch site. The bulk of the interior volume of the three rocket engine orbiter is dedicated volume for payload with a small portion allocated for propellants. During a nominal mission, these propellants are used to provide the final acceleration of the three rocket engine orbiter to orbital velocity. As with the first preferred form, when it is desirable to lift the ET to orbit this can be done with a corresponding reduction of payload delivered on that mission. In a failure scenario, the propellants contained in the three rocket engine orbiter permit the three rocket engine orbiter and the crew to safely escape a failed four rocket engine booster and or a failed ET during any portion of the mission. In this second preferred form, under nominal circumstances, all seven rocket engines contribute to liftoff thrust. This level of output thrust permits an increase in the length and associated propellant capacity of the ET compared to the ET used in the previous preferred embodiment and to approximately the same length as the unmodified space shuttle ET. This level of performance from the four rocket engine orbiter and three rocket engine booster results in a payload lift capacity of approximately 95K pounds to the international space station. In addition to this increased payload capacity, the vehicle can also be sized to provide a margin to allow for positive vehicle acceleration with a failed engine. The inherent level of thrust provided by any six out of the seven available engines enables a full engine out abort capability right from liftoff. In the highly remote case of multiple engine failures or of a failed ET, the ET can be prematurely jettisoned allowing escape and recovery of both the three rocket engine orbiter and the four rocket engine orbiter. This wide range of tolerance to otherwise catastrophic failures greatly enhances the safety and reliability of launch.

In a third form, a two-two rocket engine orbiter with a four engine booster is attached to an ET. Two of the rocket engines on the two-two rocket engine orbiter utilize the LOX and LH propellants and are preferably SSMEs. The remaining two engines of the two-two rocket engine orbiter are referred to as hydrocarbon propellant engines that utilize LOX and a hydrocarbon propellant, such as a jet propellant or a rocket propellant, and are preferably NK33 engines. The interior volume of the two-two engine orbiter is comprised principally of payload volume, LOX volume and hydrocarbon propellant volume. This third form provides an alternate main propulsion system with increased tolerance to failures of the LOX and LH propulsion system. Nominally the two-two rocket engine orbiter stages from the ET at a velocity of approximately 16K fps and the two-two orbiter continues to orbit using only the LOX and hydrocarbon propellants contained within the two-two orbiter and then using only the two hydrocarbon propellant engines. This third form also provides the flexibility to carry the ET to orbit. When the launch vehicle delivers the ET to orbit, the propellant of ET is injected into the two-two rocket engine orbiter and four rocket engine booster until reaching final orbit. Because the higher injected performing LOX and LH propellants of the ET accelerate more mass to orbit, an increase in launch mass is realized. However, this increase in injected mass is approximately offset by the need to also carry the ET to orbit. On missions in which it is desirable to bring the ET to orbit, the X33 orbiter compromises the ability to escape from the ET during the final portion of the ascent. The LOX hydrocarbon propellant engines on the two-two engine orbiter can also provide orbital maneuvering capability to eliminate a separate maneuvering subsystem.

In a fourth form, two X33 four engine boosters are attached to a core stage to provide ultra heavy lift with a full engine out capability. The two X33 boosters are used to augment the lift capability of the core stage that includes a payload bay. The core stage launch vehicle includes the two X33 boosters with four SSMEs each and the core stage that houses ET type propellants tanks with two high thrust output expendable rocket engines such as low cost, high thrust RS68 rocket engines. The core stage also has a forward payload fairing that houses the payload in the payload bay. In this fourth form, both of the boosters have internal volumes dedicated to housing propellants that can be communicated with the core stage.

The preferred forms of the invention offer multiple X33 derived launch vehicles. Each of the X33 vehicles is retrofitted with multiple flight proven SSMEs that provide substantially more thrust. The increased lift capability provided by the higher thrust SSMEs allow the modified X33s to lift the existing, but slightly modified ET. In the flight arrangement, the X33 stages are mounted to the ET or core stage. The new launch vehicles integrate modified X33 hardware, SSMEs, NK33s, and a modified ET or core stage for reduced development costs. The modified X33 orbiter is projected to have an injected weight of approximately 95K pounds and provides an internal volume of approximately 12K cubic feet. This metric is calculated after increasing the X33 injected weight by 17K pounds to account for the design modifications to the X33 orbiter. The ratio of injected mass to enclosed volume is 7.75 for the X33 orbiters.

Excluding the benefit of the additional volume for propellants in the X33 orbiter, the reduced injected mass allows 75K pounds additional payload to be delivered to orbit. The propellants onboard the X33 orbiter are sufficient to impart the final delivery delta velocity as much as 10K feet per second. This allows the ET to separate and reenter well before having to be brought to orbit. Because the ET and residual propellant mass is on the order of 70K pounds, eliminating the need to carry the ET all the way to orbit increases payload by approximately 35K pounds. These new configurations offer as much as 95K pounds of payload that can be delivered to international space station orbit using the three rocket engine orbiter and four rocket engine booster design.

By using well proven and better performing SSMES, the thrust of the X33 derived vehicles is greatly increased. The three, four and five SSMEs and two-two engine configuration can be incorporated into the existing base area of the X33 while providing sufficient access to allow accommodation for engine servicing. The approximately 14' foot high and 36' foot wide base on the X33 vehicle provide sufficient space for up to five SSMEs. With the 7.5 foot diameter nozzles of the SSMEs, using a staggered configuration, space exists for both an upper and lower row of SSME engines on the base of the X33 booster and orbiter. Using five engines on each booster and the two engine core stage, a combined thrust of over six million pounds can be achieved. With a fully loaded core stage and two fully loaded X33 derived vehicles, this configuration can deliver a substantial mission payload of more than 200K pounds. An orbiter and a booster configuration both with three engines can be used to provide a reduced payload design of approximately 50K pounds. The invention is described in reference to four preferred forms but many variants are possible. These and other advantages will become more apparent from the following detailed description of the preferred embodiment.

BRIEF DESCRIPTION OF THE DRAWINGS

FIG. 2B is a diagram of a three rocket engine orbiter.

DETAILED DESCRIPTION OF THE PREFERRED EMBODIMENT

Figure 1A:
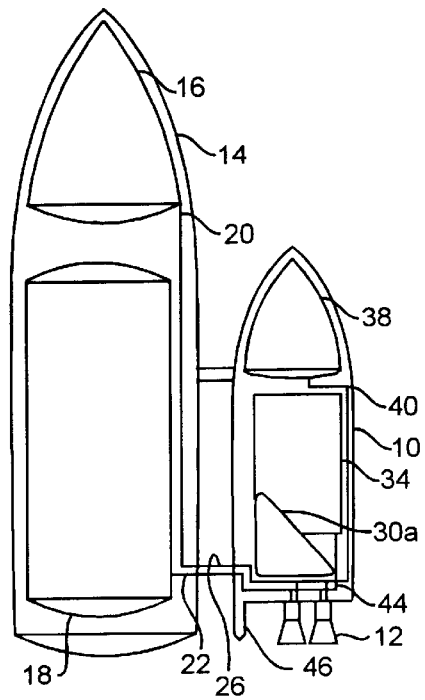
FIG. 1A is a diagram of a single orbiter five rocket engine launch vehicle.
Figure 1B:
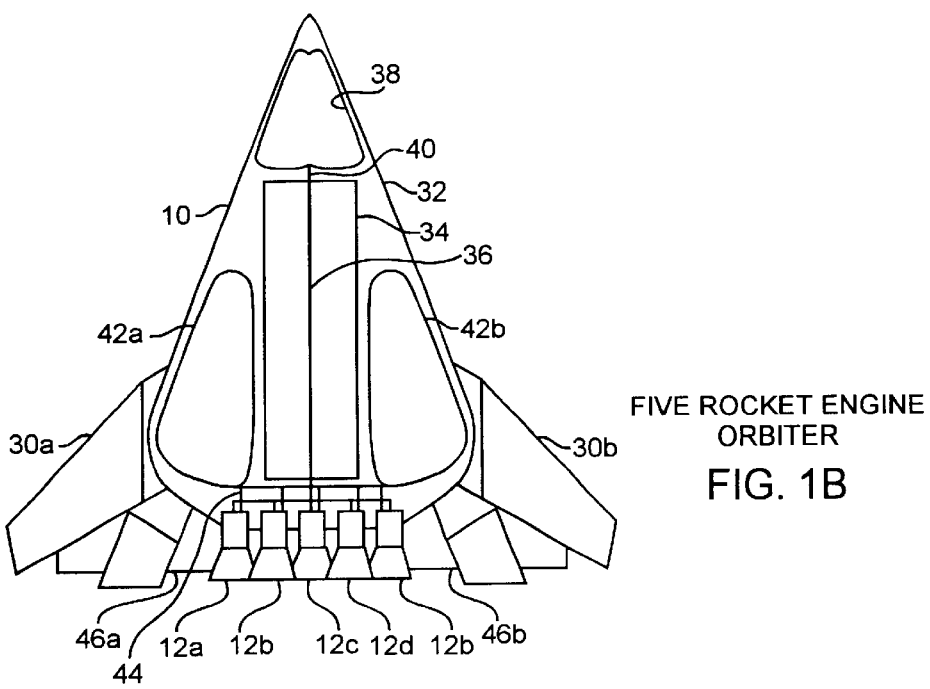

An embodiment of the invention is described with reference to the figures using reference designations as shown in the figures. Referring to FIGS. 1A and 1B, in a first preferred form, a single orbiter five rocket engine launch vehicle includes a five engine orbiter 10 having bell nozzle rocket engines, which may be space shuttle main engines (SSME) type rocket engines 12*a*, 12*b*, 12*c*, 12*d* and 12*e*. The orbiter 10 is coupled to an external tank 14 having a liquid oxygen (LOX) tank 16 and a liquid hydrogen (LH) tank 18. The LOX tank 16 have LOX tank feed lines 20 and the LH tank 18 has LH tank feed lines 22 for respectively communicating oxidizer and propellant to the engines 12 through an orbiter and ET propellant interconnect 26 that also serves to structurally couple together the orbiter 10 to the external tank 14. The orbiter 10 and ET 14 are also structurally coupled together using an orbiter and ET structural interconnect 28. The five engine orbiter 10 includes a left orbiter flight control surface 30a, a right orbiter flight control surface 30b, an X33 aeroshell 32, a orbiter payload bay 34 for housing a payload not shown, orbiter payload bay doors 36 for enclosing the payload bay 34, an orbiter LOX tank 38, an orbiter LOX tank feed line 40 for delivery LOX to the orbiter engines 12, a left LH tank 42a, a right LH tank 42b, a LH tank feed line 44 for delivering LH to the orbiter engines 12, orbiter body flaps 46 including orbiter left orbiter body flaps 46a and right orbiter body flaps 46b.

In this 5-0 launch vehicle, a significant portion of the internal volume of the X33 aeroshell of the orbiter 10 is dedicated to a 15 foot diameter by approximately 40 foot length payload bay 34. The remaining internal volume of the orbiter 10 is used to house LOX and LH propellants in tanks 38, 42a and 42b. The belly of orbiter 10 is mated to the shortened ET 14. The propellant interconnect 26 is provided preferably at the rear of the windward side to communicate propellants between the ET and the SSME engines 12. During the initial portion of the ascent trajectory of the single orbiter five rocket engine launch vehicle, the ET 10 supplies the SSME engines 12 with propellants. Later in the trajectory, propellants contained within the X33 aeroshell orbiter 10 in tanks 38, 42a and 42b are used to provide the remaining acceleration to orbital velocity. Should a critical failure of the ET 14 occur prior to separation of the ET 14, propellants housed in tanks 38, 42a and 42b would provide a source of fuel for the orbiter 10 to escape from the failed ET 14. Using the propellants housed within the X33 aeroshell orbiter 10 to achieve orbital velocity and injection, the launch vehicle of the first preferred form provides approximately 55K pounds of payload. This first embodiment may use a leeward surface, not shown, that allows access to the 15' foot diameter of the payload bay 34. Forward located canards, not shown, may also be added to accommodate the rearward shift in the center of gravity of the vehicle associated with the heavier engines. Alternately, an offset center of gravity could be eliminated when the vehicle always provides a downweight payload that could be located forward in the orbiter to provide ballast mass. The increased return mass may use modification to the thermal protection system material selection to include use of more robust materials such as titanium aluminide.

Although it is to place all of the propellants to achieve orbit into the ET 14, a portion of the primary propellants is located inside the X33 aeroshell orbiter 10 so that the X33 aeroshell orbiter 10 could, under its own power, escape from a failed ET during launch. In addition, the propellants dedicated for escape of the X33 orbiter 10, the five rocket engines 12a, 12b, 12c, 12d and 12e increase the payload carrying capability by eliminating the need to accelerate the ET 14 to orbital velocity. This reallocation of orbiter interior space to propellant capacity increases the payload delivery capacity of the single orbiter five rocket engine launch vehicle. Operational uses of the launch vehicle would be dependent on mission objectives. On missions in which the payload is to be maximized, the ET 14 could be jettisoned prior to achieving orbital velocity, thus maximizing useful payload of the orbiter 10. Conversely, on missions where a practical use for the empty ET 14 can be found, such as a propellant depot or as a outer shell for an orbital habitat, the ET 14 could be delivered to orbit. This mission would result in a small loss in payload carrying capacity.

The launch vehicle offers a low development cost, low recurring operating cost, and excellent traceability and heritage to existing systems. Because all of the principle elements of the launch vehicle already exist, the X33 aeroshell orbiter and key subsystems such as landing gear, not shown, there is a low development cost. The heritage associated with use of existing components fosters rapid development of an integrated vehicle health management capability to enable rapid diagnosis and response to failures and maintenance needs. The improved level of operability of launch vehicle, combined with efficient use of the ET 14 without solid rocket boosters also provide a reduction in launch system operating costs to improve the flight rate capability. The ability to eliminate the solid rocket boosters, provide engine abort capabilities including jettison from a failed ET 14 during the ascent trajectory to improve safety and reliability. The X33 orbiter offers an enormous 10K cubic feet payload bay 34. To maximize the utility of the available thrust, the ET may be adjusted in length, but preferably not in diameter. In the two high and three low engine arrangement a shortened ET with 25% reduction in propellants is employed. This configuration also stages the ET 14 at approximately 16K feet per second at which point the orbiter 10 also continues to orbit using internal propellants.

Other variations of the launch vehicle may be realized. The forward mounted LOX tank 38 is maintained in the X33 orbiter 10. However, should larger payload volume be required to be mounted internally, the LOX tank 38 can also be removed and its volume demands reallocated to the ET 14. This reallocation would require an additional 3% stretch of the ET. A variety of launch vehicle configuration offer a wide variety of spacelift applications. For each application, it is anticipated that minor modifications will be required to tailor the launch vehicle to specific applications.

Figure 2A:
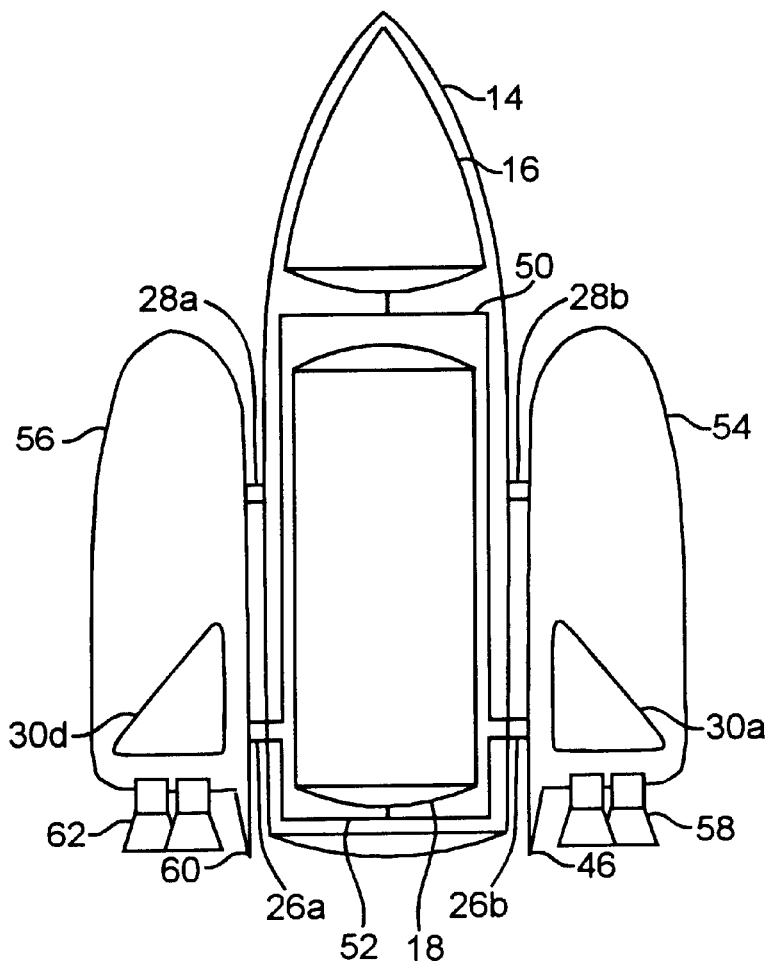
FIG. 2A is a diagram of a four rocket engine booster and three rocket engine orbiter launch vehicle.
Figure 2B:
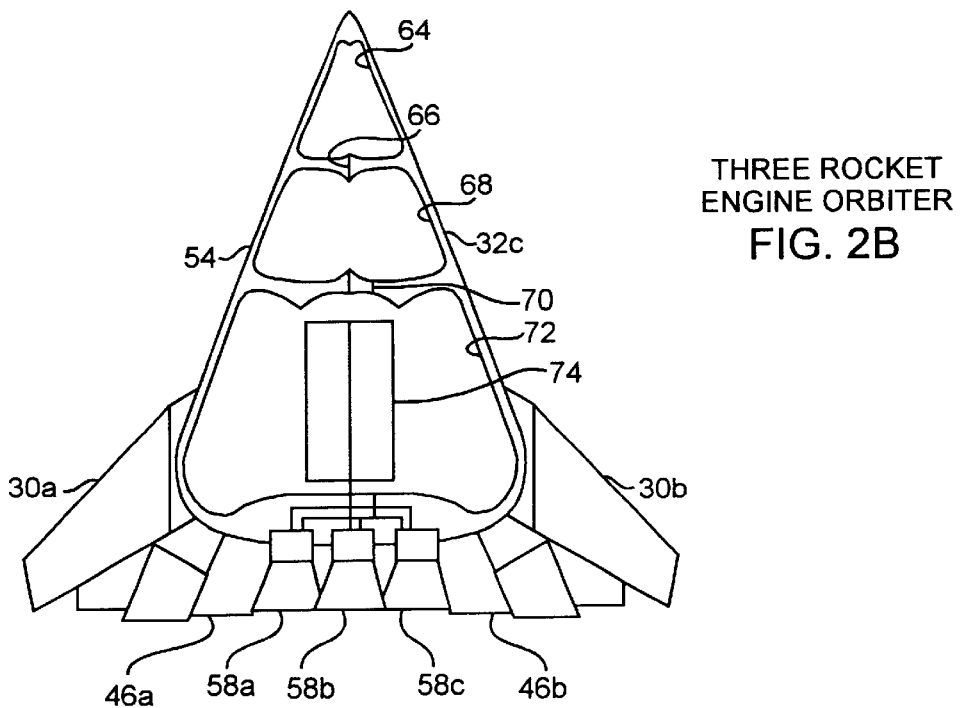
FIG. 2B is a diagram of a five rocket engine orbiter.
Figure 2C:
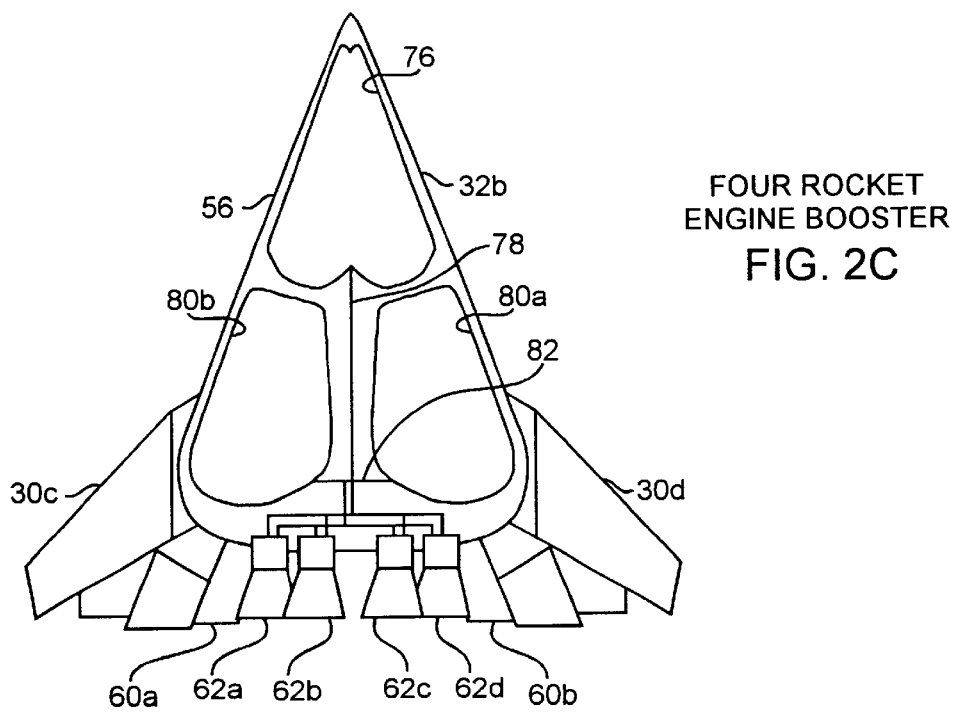
FIG. 2C is a diagram of a four rocket engine booster.

Referring to FIGS. 1A, 1B, 2A, 2B, and 2C, and more particularly to FIGS. 2A, 2B, and 2C, a four rocket engine booster and three rocket engine launch 3–4 vehicle include the ET 14, a three engine X33 orbiter 54 having an X33 aeroshell 32a and a four engine X33 derived booster 56 having an X33 aeroshell 32b. The orbiter 54 also includes the flight control surfaces 30a and 30b and the body flaps 46 including flaps 46a and 46b. The booster 56 has X33 left and right flight surfaces 30c and 30d as well as booster body flaps including left and right booster body flaps 60a and 60b. The booster 56 and orbiter 54 are coupled to the ET 14 using respective propellant interconnect 26a and 26b and using respective structural interconnects 28a and 28b. In the second form, the ET 14 is modified to have a split LOX external tank feed line 50 and a split LH external tank feed line 52 for respectively communicating LOX and LH to three orbiter engines 58 that are preferably SSHE type engines 58a, 58b, and 58c, and to four booster engines 62 that are preferably SSME type engines 62a, 62b, 62c, and 62d. The orbiter 54 includes a three engine orbiter LOX tank 64 with a three engine orbiter LOX tank feed line 66, a three engine orbiter LH tank 68 and a three engine orbiter LH tank feed line 70, all of which are for providing LOX and LH propellants to the orbiter engines 58. The orbiter 54 also includes a three engine orbiter payload bay 72 having payload bay doors 74. The booster 56 including four engine booster LOX tank 76 having a four engine booster LOX tank feed line 78, a right booster LH tank 80a, a left booster LH tank 80b, and a four engine booster LH tanks feed line 82 all of which are for providing LOX and LH propellants to the booster engines 62. The launch vehicle of FIG. 2 includes the orbiter 54 and booster 56 having X33 aeroshells 32*a* and 32 and having bell rocket engines 62 and 58 and includes a propellant feeding stage that is a modified ET 14.

The 3-4 engine launch vehicle of the second form provides approximately 2.8 million pounds of thrust at liftoff that is a thrust level sufficient to launch the 2.4 Million pound gross liftoff weight vehicle with adequate thrust margin for acceleration and enough reserve thrust to accommodate the loss of one engine at liftoff. The 3-4 launch vehicle allows a successful abort back to the launch base at the worst possible time of engine failure while providing 80K pounds of payload into orbit with each launch. This large payload mass capability is enabled by a combination of the structural efficiency of the X33 design, the ultra low structural mass fraction of the ET at only 4% the mass of the contained propellants, and the two stage design in which the entire dry mass of the launch vehicle is delivered to orbit as is required of an single stage to orbit design.

For a maximum payload of 95K pounds per mission, the 3-4 launch vehicle takes off with all SSME 62 and 58 operating at a nominal thrust of 400K pounds thrust per engine. This thrust level is equal to 104% of the original SSME specification and, due to the wide throat redesign of the SSME and is equivalent in stresses to the original 90% thrust level. At launch, both the orbiter and booster engines 58 and 62 are supplied with propellants from the centrally positioned ET 14. This arrangement requires that the ET be fitted with Y joints in the lines 50 and 52 to split the propellant flow to the two attached X33 aeroshell stages 54 and 56. Approximately one minute prior to booster burnout, at approximately mach 3, the booster to ET propellant interconnect 26*a* is closed and the booster 56 begins to feed off still fully loaded internal propellant tanks 76, 80*a* and 80*b*. After booster engine shutdown and staging, the booster 56 returns to the launch base to begin processing for the next launch, as the orbiter 54 and the ET 14 continue to orbit. The LOX tank 76 of the booster may be completely evacuated prior to draining the LOX tank 16 or the ET 14. The specific order of tank evacuation may not be flight critical. After orbit insertion and orbiter engine 58 shut down, and the ET 14 can either be separated and remain in orbit, or be deorbited and burned up in the atmosphere. Because the payload capability of the second form is increased three times, the amortized cost per pound in terms of payload of the ET 14 is still low when the ET 14 is used in this expendable fashion. Alternatively, when the ET remains in orbit, the ET can function as a building block for space habitats or as an orbital propellant depot.

Figure 3:
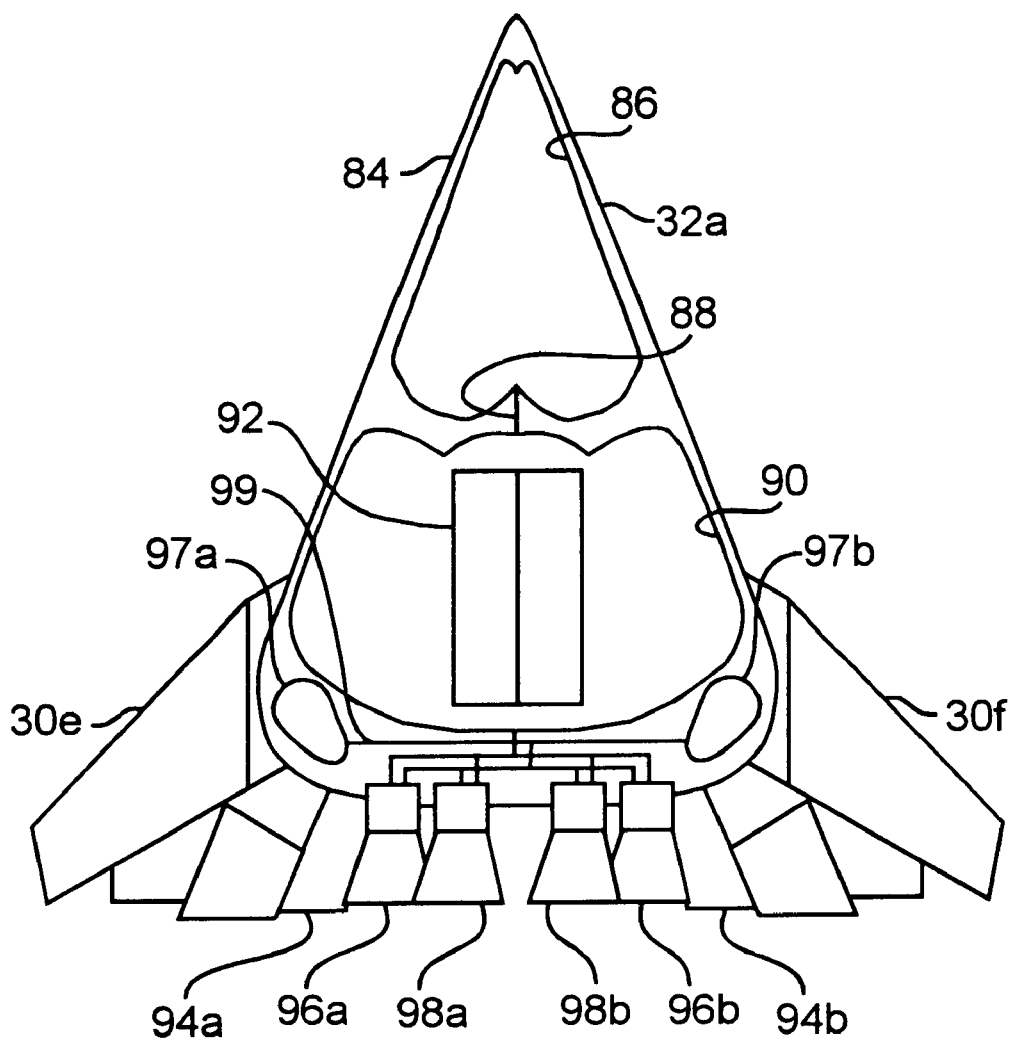
FIG. 3 is a diagram of a two-two rocket engine orbiter.

Referring to FIGS. 1A, 1B, 2A, 2B, 2C and 3, and more particularly FIG. 3, a third form 3 is a 4-2-2 launch vehicle, not shown, that uses the ET 14, the four engine booster 56 and a modified X33 two-two engine orbiter 84 also having an X33 aeroshell 32*c*, left and right X33 flight control surfaces 30*e* and 30*f,* but has a different propulsion system. The two-two engine orbiter 84 includes a large LOX tank 86 with a two-two engine orbiter LOX tank feed line 88 and a two-two engine orbiter payload bay 90 having two-two engine orbiter payload bay doors 92. The two-two orbiter also has left two-two engine orbiter body flaps 94*a* and right two-two engine orbiter body flaps 94*b*. For flight purposes, the five engine orbiter 10, the three engine orbiter 54, four engine booster 56, and the two-two engine orbiter 84 all have substantially the same aeroshell flight control surfaces, flaps, and vehicular skin shape providing commonality in flight control operations. The two-two engine orbiter preferably include two hydrocarbon propellant engines, for example, a left NK33 orbiter engine 96*a* and a right NK33 orbiter engine 96*b,* respectively respective fueled by a left two-two engine orbiter rocket propellant tank 97*a* and a right two-two engine orbiter rocket propellant tank 97*b*. The two-two engine orbiter also includes a left SSME orbiter engine 98*a* and a SSME orbiter engine 98*b*. The hydrocarbon propellant tanks 97*a* and 97*b* and LOX tank 86 feed the hydrocarbon rocket engines 96*a* and 96 through a hydrocarbon propellant tanks feed line 99 and LOX feed line 88, as the ET LOX tank 16 and the ET LH tank 18 feeds the SSME engines 98*a* and 98*b* through the propellant interconnect 26*b* through respective LOX and LH feed lines 50 and 52. In the third form, in the two-two orbiter 84 does not include a LH tank as the SSMEs 98*a* and 98*b* receive LH propellant from the ET 14. In the orbiter 84, the LOX tank 86 is 2,600 cubic feet the pair of hydrocarbon tanks are each 870 cubic feet. As a result, internal volume previously allocated to carry much larger LOX and LH2 propellant loads is converted to approximately 9K cubic feet of payload volume in payload bay 90.

The LOX and hydrocarbon propellants remain in orbiter 84 for the orbiter 84 to escape from the rest of the launch stack at any point in the trajectory, beginning in the prelaunch countdown. When it is determined that the ET is emptied during the trajectory, the ET may not be carried to orbit. The payload carrying capacity of the launch vehicle is increased to 95K pounds and increases both the safety and payload mass capacity of the 4-2-2 launch vehicle. The 4-2-2 launch vehicle also provides a robust range of abort options. For example, when an engine failure occurs early in the trajectory, the 4-2-2 vehicle allows the orbiter a return to base with the safe jettison of the empty ET. If an engine failure occurs later in the trajectory, the 4-2-2 vehicle allows for continuation to a nominal or depressed orbit dependant on the specific time of engine failure. In the extremely improbable event of the loss of two or more engines in the first 30 seconds of flight, both the booster 56 and the orbiter 84 can jettison the loaded ET 14 using on-board propellant and safely abort to the launch base. Although the jettisoned ET 14 would be mostly loaded, the ET 14 could, with trajectory design shaping, be safely disposed of in the ocean or over a deserted land area. After the first 30 seconds the ET load will be sufficiently reduced, and the booster 56 can abort attached to the ET 14 as the orbiter 84 safely separates and returns to base. In these abort scenarios, other than a catastrophic event on the orbiter 84, all failures result in a safe recovery of the manned orbiter 84. This level of safety results from the combination of multiple abort options with integrated vehicle health management, which enables sensing and safe recovery from impending failures. Thus, criticality one events such as loss of vehicle, passengers, and payload will be greatly reduced. The impending failure data retained in the integrated vehicle health management, will also contribute to a more rapid maintenance turnaround of the vehicle hardware.

In the third preferred form, the final leg to orbit after ET jettison is accomplished with LOX and hydrocarbon propellants which are considerably more dense than LOX and LH2 propellants. The LOX and hydrocarbon propellants reduce the required propellant volume. This hyrocarbon fuel operation requires that one of the three SSMEs 58 of the second form be replaced with hydrocarbon rocket engines 96*a* and 96*b* of the third form in order to provide thrust once separate from the ET. The engines 96*a* and 96*b* are preferably NK33 engines. Thus, the orbiter 84 preferably comprises two SSMEs 98*a* and 98*b* and two NK33s 96*a* and 96*b*. In a reduced throttle mode, the NK-33 engines could also serve as orbital maneuver engines once on orbit.

The orbiter propellant tanks remain mostly full of LOX and hydrocarbon rocket propellant until separation from the ET 14 at approximately a velocity of 17K feet per second. Either of the two NK33 engines provides sufficient thrust to pull the orbiter 84 away from the rest of the launch stack at any time during the mission. The NK33 engines 96a and 96b are also employed during initial seconds of launch to contribute to the initial vehicle thrust level so as to achieve a vehicle level of thrust to weight ratio of 1.2 at liftoff. Soon after liftoff, the NK33 engines 96a and 96b can be throttled back to a standby thrust operating mode in which the engines 96a and 96b provide minimum design thrust. During the initial part of the flight, the ET 14 supplies the LOX and the internal hydrocarbon tanks 97a and 97b in the orbiter 84 supplies the rocket propellant to the NK33 engines 96a and 96b. As a consequence, the rocket propellant tank 97a and 97b are not fully loaded at separation from the ET 14. The 4-2-2 is a safer configuration with the penalty of a second engine type and an additional rocket propellant type. The hydrocarbon rocket propellant also requires approximately 2,500 cubic feet of the volume otherwise allocated to the payload bay. This volume requirement for the propellant in the orbiter can be reduced to approximately 1,400 cubic feet provided auxiliary rocket propellant tanks located inside the ET 14 to supply the hydrocarbon rocket propellant are used in the initial portion of the trajectory. The ET interstage volume provides sufficient space for additional tanks when desired. Thus, 8K cubic feet of volume can be made available for payload in the payload bay 90.

The 4-2-2 launch vehicle employs two SSME 98a and 98b and two NK33 engines 96a and 96b in a two high and two low engine arrangement and employs a shortened ET 14 with a reduction in propellant. The ET at 16K feet per second of velocity may be jettisoned at which point the orbiter 84 continues to orbit using internal propellants.

Figure 4:
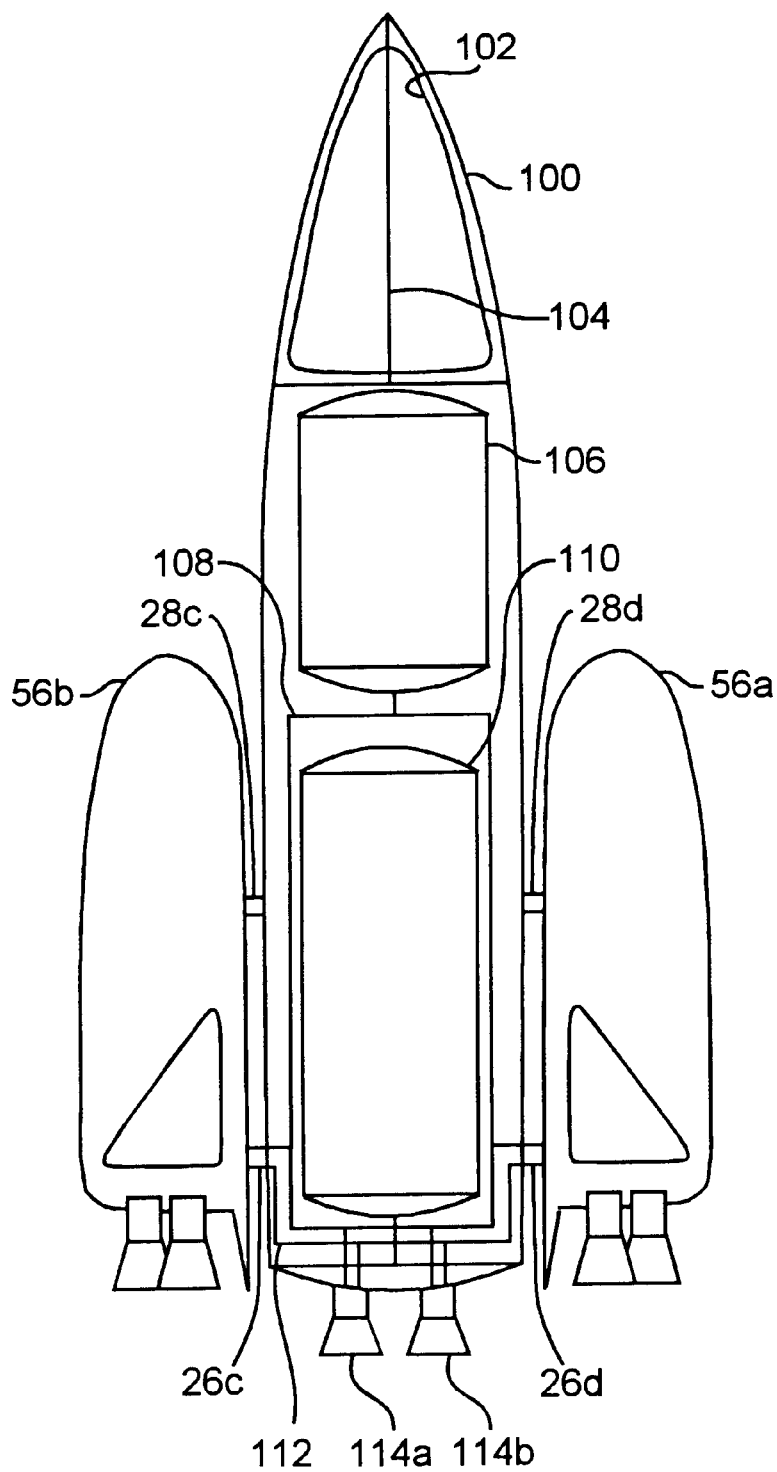
FIG. 4 is a diagram of a dual booster and core stage launch vehicle.

Referring to all of the Figures, and more particularly to FIG. 4, a dual booster and core stage launch 4-4-2 vehicle includes two four engine X33 boosters 56a and 56 and a core stage 100 respectively coupled to the boosters 56a and 56b through propellant interconnects 26c and 26d and through structural interconnects 28c and 28d. The core stage 100 includes a core stage payload bay 102 covered by a core stage payload fairing 104, a core stage LOX tank 106 having core stage LOX tank feed line 108, core stage LH tank 110 having core stage LH tank feed line 112, a left RS68 bell nozzle rocket core stage engine 114a and a right RS68 bell nozzle rocket core stage engine 114b. The booster 56b and 56b are identical to the booster 56. The core stage 100 would require a guidance capability. The RS68 engines 114a and 114b were designed for an expendable application but have limited reuse capability and has higher thrust than is the SSME type engines. Due to the lower manufacturing cost of the RS68 and the fewer number of RS68 engines required for the same lift-off mass, it is beneficial in some cases to accept the lower cost, higher thrust using the RS68 engine. The high thrust output of the RS68 engine may also make the RS68 engine well suited as booster engines for particular unique mission applications.

The RS68 engines 114a and 114b augment the thrust capability of the side mounted boosters 56a and 56b. In this ultra heavy lift configuration of the fourth form, the large volume required by the payload may exceed the internal volume capacity of an X33 orbiter. Hence, the payload is carried in the payload bay 102 using the large fairing 104 located either on top of the core stage 100. All available internal volume of both X33 booster 56a and 56b are used to house propellants. When the payload capability of this ultra heavy lift launch vehicle is to be maximized, both of the X33 boosters 56a and 56b could be designed to stage from the core stage before reaching final orbit. Alternatively, at velocity near orbital speed , RS68 engines could be throttled back and the higher specific impulse SSME engines on the X33 boosters 56a or 56b could be used to provide the thrust to achieve final orbit.

The present invention is directed to launch vehicles having at least one rocket stage using bell nozzle rockets attached to at least one propellant feeding stage. In the preferred forms, a 5-0, 3-4, 4-2-2 and a 4-4-2 launch vehicle offer higher payload lifting capabilities, but other configurations could be used as well. For example, a five engine orbiter coupled to a core stage coupled to a booster could be configured to offer increased payload disposing two payload carrying vehicles into space. Those skilled in the art can make enhancements, improvements, and modifications to the invention, and these enhancements, improvements, and modifications may nonetheless fall within the spirit and scope of the following claims.

What is claimed is:

1. A launch vehicle for staged lifting a payload to orbit, the vehicle comprising, a rocket stage comprising bell nozzle engines for lifting the launch vehicle off Earth's surface and comprising an aeroshell for storing aeroshell liquid propellant for supplying propellant to the bell nozzle engines, and a feed stage for storing stage liquid propellant for supplying propellant to the bell nozzle engines when lifting the launch vehicle off Earth's surface.

2. The launch vehicle of claim 1 wherein, the rocket stage comprises an orbiter, the bell nozzle engines are five orbiter LH engines, the rocket stage comprises a LOX tank and a LH tank for storing the aeroshell liquid propellant, and the feed stage is an external tank comprising an ET LOX tank and an ET LH tank for supplying propellant to the five orbiter engines.

3. The launch vehicle of claim 2 wherein, the orbiter comprises a payload bay for carrying a payload.

4. The launch vehicle of claim 3 wherein, the five orbiter LH engines are SSME type engines.

5. The launch vehicle of claim 3 wherein, the aeroshell is an orbiter aeroshell, and the orbiter comprises the orbiter aeroshell that is triangular in shape with flight surfaces extending from the orbiter aeroshell.

6. The launch vehicle of claim 1 wherein, the rocket stage comprises an orbiter comprising an orbiter LOX tank and an orbiter LH tank, the rocket stage further comprises a booster comprising a booster LOX tank and a booster LH tank, the bell nozzle engines comprise three orbiter engines attached to the orbiter and comprise four booster LH engines attached to the booster, the orbiter LOX tank and orbiter LH tank supply the propellant to the three orbiter LH engines, the booster LOX tank and booster LH tank supplying propellant to the four booster engines, and the feed stage is an external tank comprising an ET LOX tank and an ET LH tank for supplying propellant to the three orbiter LH engines and the four booster LH engines.

7. The launch vehicle of claim 6 wherein, the orbiter comprises a payload bay for carrying a payload.

8. The launch vehicle of claim 6 wherein,
the three orbiter LH engines are SSME type engines, and
the four booster LH engines are SSME type engines.

9. The launch vehicle of claim 6 wherein,
the aeroshell comprises an orbiter aeroshell and a booster aeroshell,
the orbiter comprises the orbiter aeroshell that is triangular in shape with flight surfaces extending from the aeroshell, and
the booster comprises the booster aeroshell that is triangular in shape with flight surfaces extending from the aeroshell.

10. The launch vehicle of claim 1 wherein,
the rocket stage comprises an orbiter comprising an orbiter LOX tank and a hydrocarbon propellant tank,
the rocket stage further comprises a booster comprising a booster LOX tank and a booster LH tank,
the bell nozzle engines comprise two orbiter LH engines and two orbiter hydrocarbon engines, the two orbiter LH engines and the two orbiter hydrocarbon engines are attached to the orbiter,
the bell nozzle engines further comprise four booster LH engines attached to the booster,
the orbiter LOX tank and hydrocarbon tank supply the propellant to the two orbiter hydrocarbon engines,
the booster LOX tank and booster LH tank supplying propellant to the four booster LH engines, and
the feed stage is an external tank comprising an ET LOX tank and an ET LH tank for supplying propellant to the two orbiter LH engines and the four booster LH engines.

11. The launch vehicle of claim 10 wherein,
the orbiter comprises a payload bay for carrying a payload.

12. The launch vehicle of claim 10 wherein,
the two orbiter LH engines are SSME type engines,
the two orbiter hydrocarbon engines are NK33 type engines, and
the four booster LH engines are SSME type engines.

13. The launch vehicle of claim 10 wherein,
the aeroshell comprises an orbiter aeroshell and a booster aeroshell,
the orbiter comprises the orbiter aeroshell that is triangular in shape with orbiter flight surfaces extending from the orbiter aeroshell, and
the booster comprises the booster aeroshell that is triangular in shape with flight surfaces extending from the booster aeroshell.

14. The launch vehicle of claim 1 wherein,
the rocket stage comprises a first X33 booster and a second X33 booster,
the bell nozzle engines comprise a first set of four LH engines, a second set of four LH engines, and a third set of two LH engines,
the first X33 booster comprises a first LOX tank and a first LH tank for supplying propellant to the first set of four LH engines attached to the first X33 booster,
the second X33 booster comprises a second LOX tank and a second LH tank for supplying propellant to the second set of four LH engines attached to the second X33 booster, and
the feed stage is a core stage comprising a third LOX tank and a third LH tank for supplying propellant to the third set of two LH engines attached to the feed stage.

15. The launch vehicle of claim 14 wherein,
the feed stage comprises a payload bay for carrying a payload.

16. The launch vehicle of claim 14 wherein,
the first and second sets of four LH engines are SSME type engines, and
the third set of two LH engines are RS68 type engines.

17. The launch vehicle of claim 14 wherein,
the first X33 booster comprises a first X33 aeroshell that is triangular in shape with X33 flight surfaces extending from the first X33 aeroshell, and
the second X33 booster has a second X33 aeroshell that is triangular in shape with X33 flight surfaces extending from the second X33 aeroshell.

* * * * *